United States Patent [19]

Wrona et al.

[11] Patent Number: 5,139,716
[45] Date of Patent: Aug. 18, 1992

[54] METHOD OF FABRICATING COOLABLE CERAMIC STRUCTURES

[75] Inventors: Bernard J. Wrona, El Toro; David G. Paquette, Costa Mesa, both of Calif.

[73] Assignee: Loral Aerospace Corp., New York, N.Y.

[21] Appl. No.: 483,473

[22] Filed: Feb. 20, 1990

[51] Int. Cl.$^5$ ............................................. C04B 33/32
[52] U.S. Cl. ................................... 264/59; 264/60
[58] Field of Search ............................. 264/59, 60

[56] References Cited

U.S. PATENT DOCUMENTS

| | | | |
|---|---|---|---|
| 3,437,723 | 4/1969 | Habermann | 264/59 |
| 3,533,753 | 10/1970 | Berger | 264/59 |
| 3,731,893 | 5/1973 | Stalmach, Jr. . | |
| 3,785,591 | 1/1974 | Stalmach, Jr. . | |
| 3,793,861 | 2/1974 | Burkhard et al. . | |
| 4,353,957 | 10/1982 | Rutt et al. | 264/59 |
| 4,358,772 | 11/1982 | Leggett . | |
| 4,629,397 | 12/1986 | Schweitzer . | |
| 4,713,275 | 12/1987 | Riccitiello et al. . | |
| 4,786,015 | 11/1988 | Niggemann . | |
| 4,867,932 | 9/1989 | Kimura et al. | 264/59 |
| 4,917,843 | 4/1990 | Gyarmati | 264/60 |

Primary Examiner—James Derrington
Attorney, Agent, or Firm—Harry G. Weissenberger; Edward J. Radlo; Keith L. Zerschling

[57] ABSTRACT

Coolant passages (14) of non-machinable size and shape are formed in a ceramic body (10) by individually forming sections (16) of the body (10), embedding graphite (20) therein during preforming, assembling the sections (16) into a complete preform (11), integrating the preform (24) by densifying it in an inert atmosphere under heat and pressure, and then heating the densified preform (10) in air to vaporize the graphite (19,20). In another aspect of the invention, a ceramic body (32) is formed from a three-dimensional, filled-in weave of silica fibers (30) in which the fibers (34) extending in one of the three dimensions are graphite and are subsequently vaporized.

13 Claims, 5 Drawing Sheets

METHOD OF FABRICATING COOLABLE CERAMIC STRUCTURES

FIELD OF THE INVENTION

This invention relates to nosetips or windows for missiles, and more particularly to a method of manufacturing coolable structures which allow the use of infrared-transparent high-temperature materials.

BACKGROUND OF THE INVENTION

On-board guidance systems for missiles often involve forward-looking systems using microwave radiation. Advanced missiles may travel at speeds up to Mach 6 or more. At these speeds, the nosetip and front sides of the missile are subjected to intense aerodynamic heating to temperatures on the order of 1250° C. There are metals and metal-containing ceramics which can withstand such temperatures when cooled, but these material are poorly or not at all transparent to microwave radiation or radar.

More suitable for this purpose are silicon nitride-based non-metallic ceramics such as Nitroxyceram (a family of ceramic compositions consisting of $Si_3N_4$, BN and preferably also $SiO_2$, the preferred proportions being 50% silicon nitride, 30% boron nitride, and 20% silica) or silica-based materials such as AS-3DX Astroquartz manufactured by J. P. Stevens Co. These materials are machinable and adequately transparent, but their transparency degrades at elevated temperatures, therefore they need to be cooled in use. Cooling can be accomplished by causing an inert gas to flow through a network of conduits opening onto the surface of the nosetip or window. These conduits are preferably rectangular in cross section and of very small dimensions in order to obtain maximum cooling with a minimal amount of gas. Because of their dimensions and the intricacy of the network, forming these conduits by machining is not feasible. For this reason, it has not previously been practical to use cooled ceramic nosetips and windows in missiles.

Prior art in this field includes: U.S. Pat. No. 3,731,893 to Stalmach, Jr. which discloses a liquid-filled metal nosetip with a discharge opening at the apex; U.S. Pat. No. 3,785,591 to Stalmach, Jr. which shows a similar device in which the coolant is expelled by heating; U.S. Pat. No. 3,793,861 to Burkhard et al. in which coolant seeps through a thin, porous ceramic material overlaid on a sintered metal substrate; U.S. Pat. No. 4,014,485 to Kinnaird et al. in which a gas is discharged through an opening at the apex of the nosetip; U.S. Pat. No. 4,358,772 to Leggett which relates to a ceramic heat-resistant radome structure; U.S. Pat. No. 4,629,397 to Schweitzer in which a turbine blade made of ceramic-covered metal felt is cooled by coolant flowing in internal ducts; U.S. Pat. No. 4,713,275 to Riccitiello et al. which relates to heat-resistant ceramic tiles for aerospace vehicles; and U.S. Pat. No. 4,786,015 to Niggeman in which a metallic nosetip skin is internally cooled by a coolant flowing through a spiral conduit.

DISCLOSURE OF THE INVENTION

The present invention makes it possible to construct coolable ceramic structures (10) with small, intricate coolant conduits (14) by forming the coolant conduits (14) as graphite inserts (19,20) during the manufacture of the ceramic preform (11), densifying the preform (11) in an inert atmosphere, and then reheating the densified part (24) in air sufficiently to vaporize the graphite (19,20). For this purpose, the nosetip (10) or other part is modularly formed of stacked discs (16) individually containing the graphite conduit patterns (20). The discs are compacted into a unitary part (24) during the densification process. The surface of the part (11) may be machined as necessary to expose the graphite patterns (20), and the graphite (19,20) can then be vaporized to form the conduits (14).

The modular construction of the nosetip (10) lends itself to the simple fabrication of quite intricate shapes and structures. In an alternative embodiment, three-dimensional structures such as thick windows (32) may be constructed of a three-dimensional silica-filled weave of silica fibers (30). If all or part of the fibers (34) in the thickness direction are composed of graphite, the resulting structure (32) after vaporization will be uniformly porous in the thickness direction, yet structurally strong and heat-resistant.

BRIEF DESCRIPTION OF THE DRAWINGS

FIG. 1b is a vertical axial section through the nosetip of FIG. 1a;

FIGS. 2a through 2f are perspective and sectional views illustrating the stages of manufacture of the upper half of the nosetip of FIG. 1a.

DESCRIPTION OF THE PREFERRED EMBODIMENT

Figure 1C:
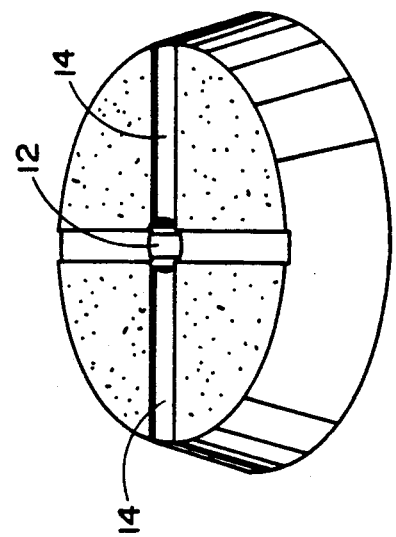
FIG. 1c is a perspective section along line 1c—1c of FIG. 1b.

The objective of the invention is the production of a nosetip 10 of Nitroxyceram (FIG. 1a) which has a central main coolant passage 12 (FIG. 1b) from which thin secondary coolant passages 14 (FIG. 1c) of rectangular cross section radiate toward the outside of the nosetip 10. Typically, the cross section of the passages 14 is on the order of 0.1 mm by 0.6 mm.

Because machining passages of this size and shape is not practically feasible, the nosetip 10 of this invention is manufactured by dividing it into a plurality of disks 16 (FIG. 2b) corresponding in thickness to the interval between two adjacent levels of passages 14.

Figure 1B:
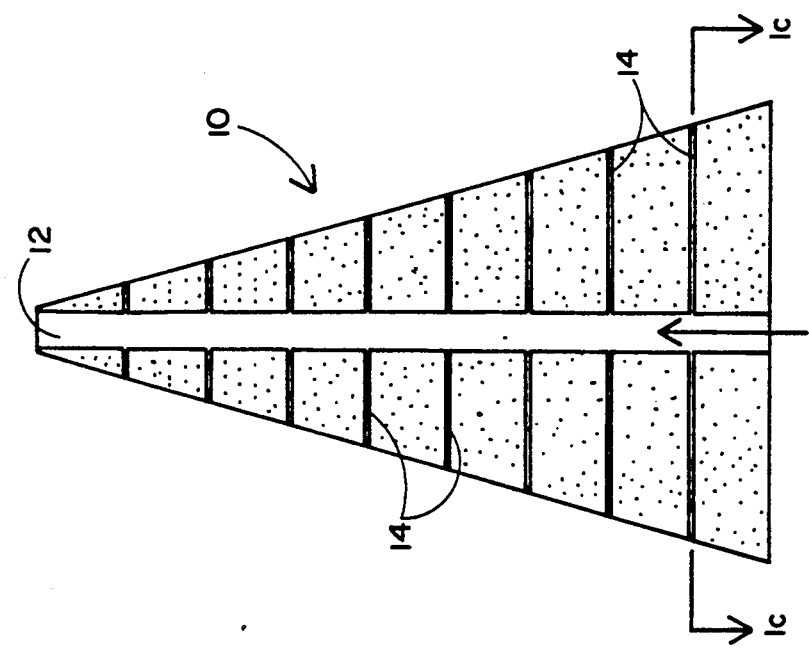
Figure 1A:
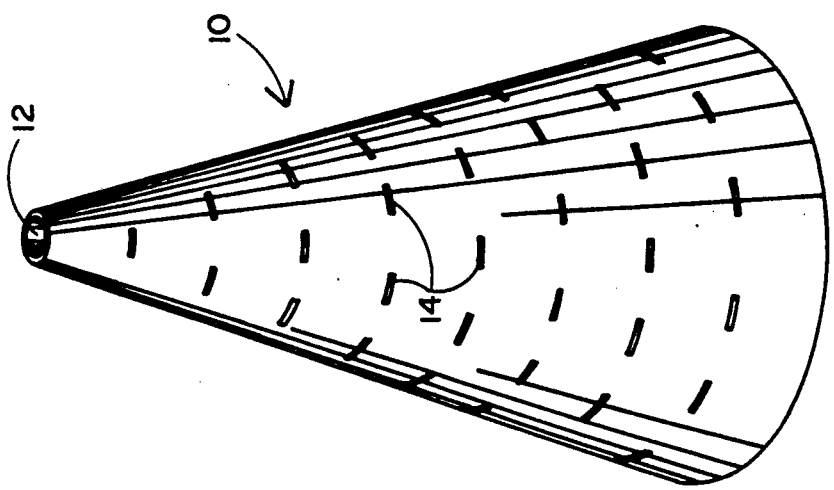
FIG. 1a is a perspective view of a nosetip produced in accordance with the invention.

For clarity of illustration, the process FIGS. 2a-f show only the upper half of the nosetip 10 of FIG. 1a. It will be understood that the lower half of nosetip 10 would be manufactured, and integrated with the upper half, in the same way.

Figure 2C:
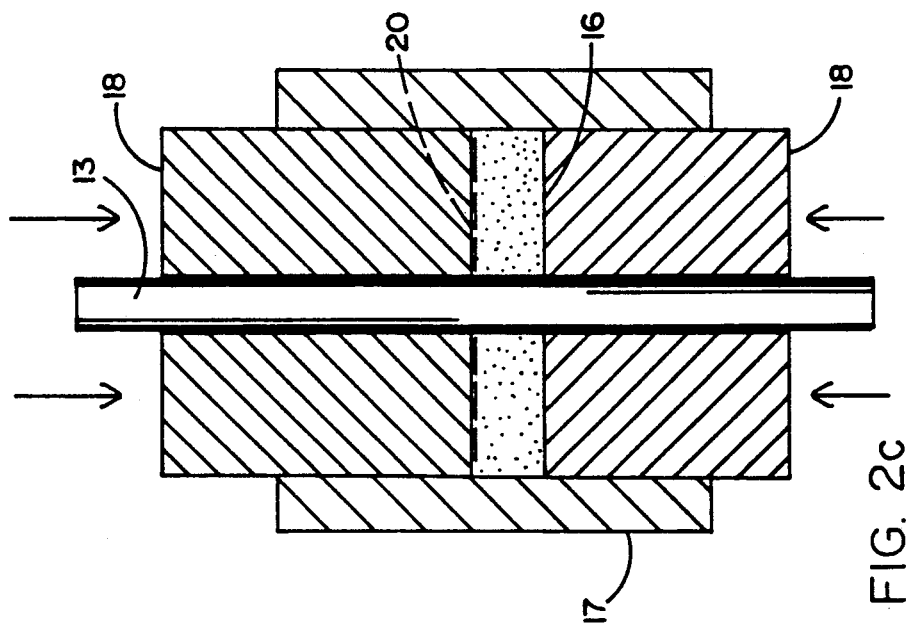
Figure 2B:
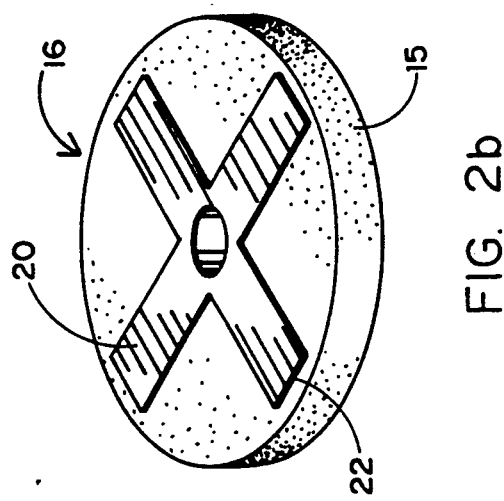
Figure 2A:
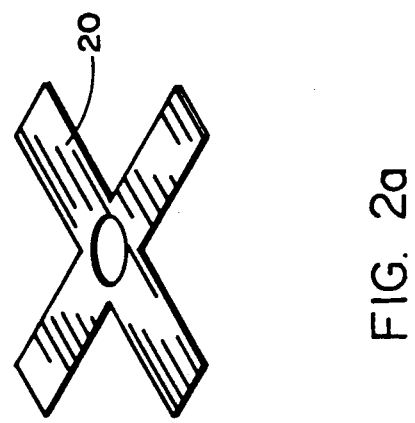
Figure 2F:
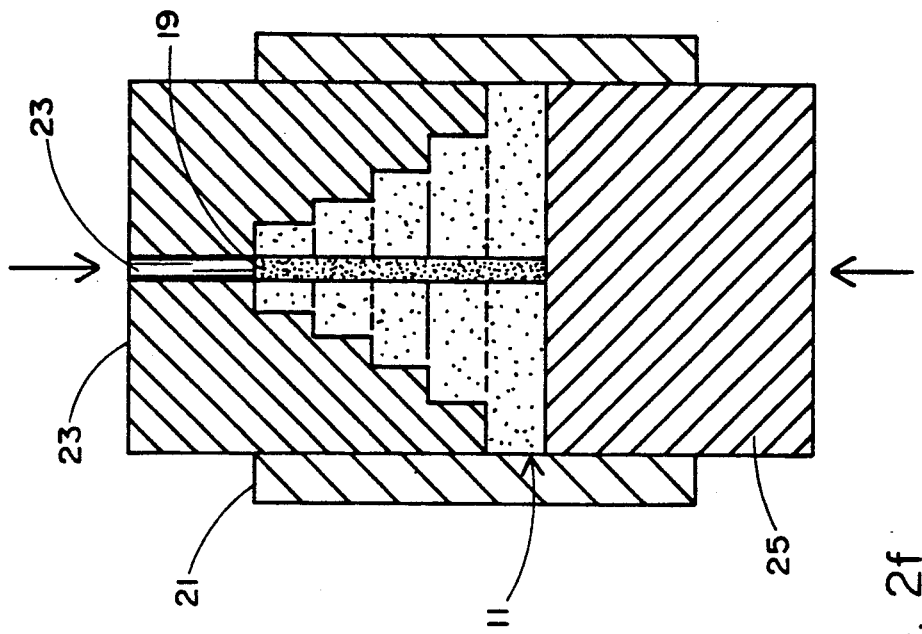

As best shown in FIGS. 2a through 2c, each disk 16 (FIG. 2b) is composed of a ceramic substrate 15 into which a graphite body 20 (FIG. 2a) in the shape of the passages 14 has been embedded. Although any suitable form of graphite (e.g. plates) and any suitable assembly method may be used, the disks 16 are preferably separately fabricated by pouring powdered Nitroxyceram into a die 17 (FIG. 2c), placing a suitably shaped sheet 20 of Grafoil (a sheet form of graphite on the order of 0.1 mm thick, manufactured by Union Carbide Company) onto the powder, and then uniaxially cold-pressing both between die punches 18 to achieve about 25-30% of the Nitroxyceram's full density.

Figure 2E:
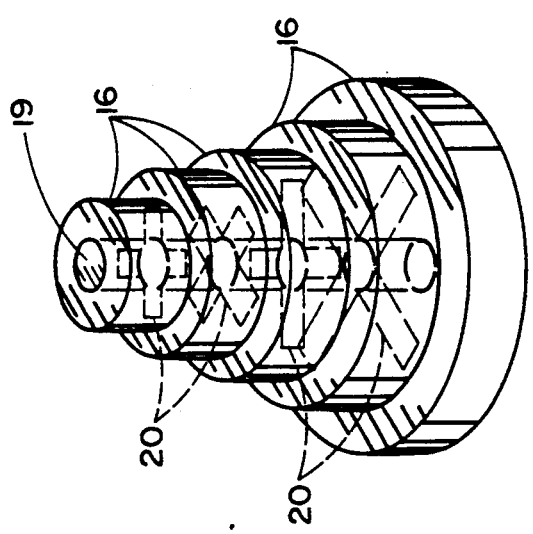
Figure 2D:
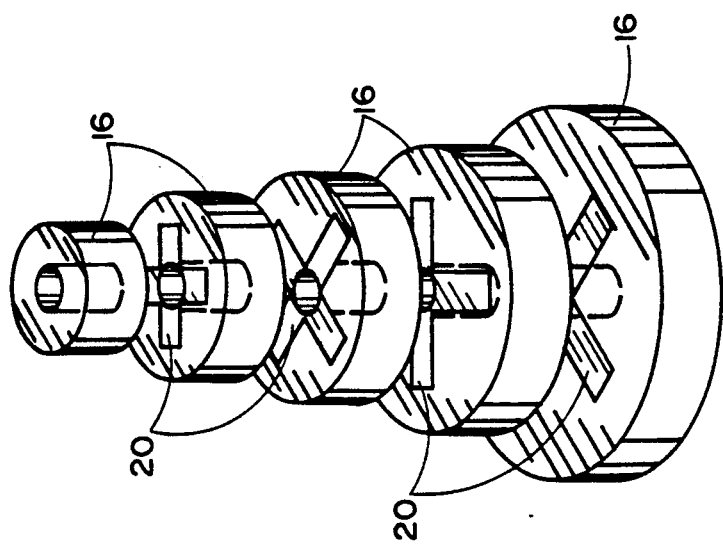

The partially densified disks 16 (FIG. 2d), with the graphite inserts 20 imbedded therein, have a central opening formed therein by the cod rod 13 of the die set in FIG. 2c. The disks 16 are next stacked over a graphite rod 19 to form an approximation of the nosetip 10 (FIG. 2e). As thus assembled, the preforms 16 are again uniaxially cold-pressed (FIG. 2f) in a die 21 between die punches 23, 25 to achieve about 50% of the Nitroxyceram's full density. This second cold-pressing merges the discs 16 into a unitary preform with a central graphite core 19 which will eventually become the main coolant passage 12. Cold isostatic pressing in liquid may also be used to improve the uniformity of density in the preform and increase green strength. The green preform is then machined to a conical nosetip shape.

The preform 11 is now fully densified (FIG. 2g) by, e.g., hot isostatic pressing (indicated by pressure arrows 27 and heat arrows 29) at about 1700° C. in an inert gas such as argon at about 1000 atmospheres. Because the graphite parts do not densify, their edges 22, which are originally inward of the perimeter of disks 16 to avoid crumpling during densification, become substantially even with the perimeter of disks 16 after full densification.

The densified preform 24 can now be again machined (FIG. 2h) to produce the final size of nosetip 10, and to make sure that all of the graphite inserts 20 are exposed to the outside of nosetip 10 as well as being in contact with the central graphite core 19.

Figure 2H:
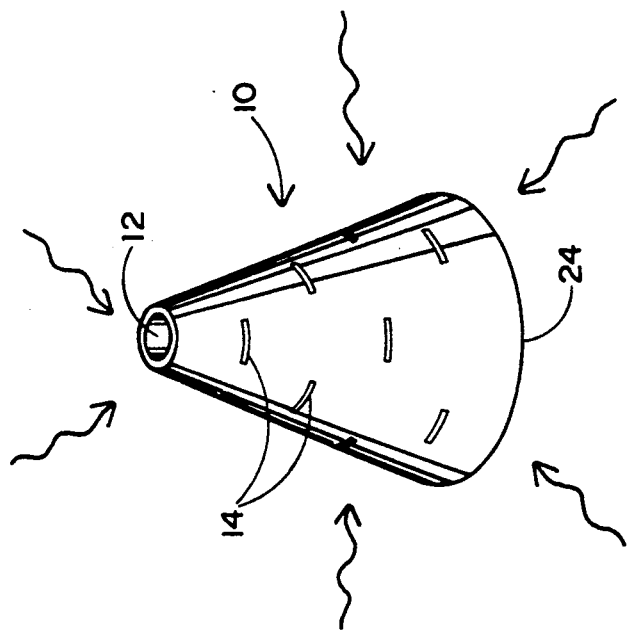
Figure 2G:
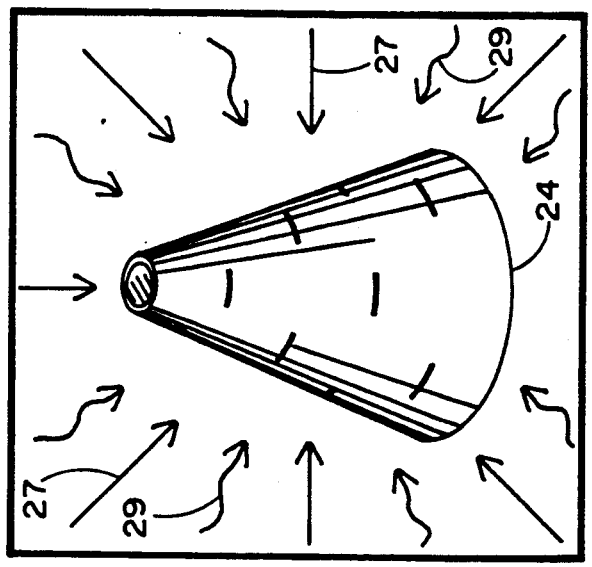

Finally, the nosetip 10 is heated to about 900° C. in air (heat arrows in FIG. 2h). At this temperature, the graphite vaporizes into $CO_2$, leaving the desired small secondary coolant passages 14 and the main coolant passage 12 in the nosetip 10 (FIGS. 1a and 1b). The vaporization of the graphite leaves no contamination in passages 14. Any suitable inert cooling gas (preferably argon or helium) may be introduced into the main coolant passage 12 during the operation of the missile, and discharged through the secondary coolant passages 14 to the outside of nosetip 10.

Figure 3C:
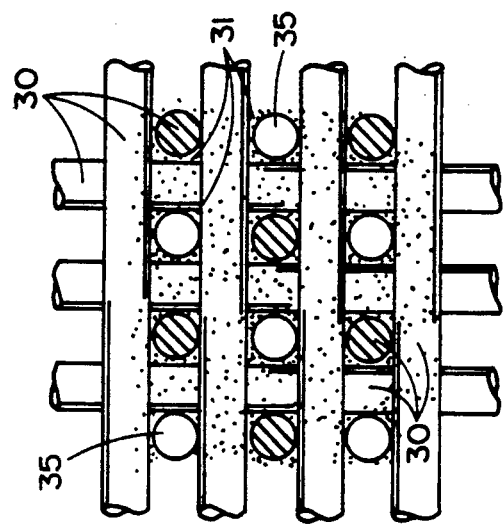
FIGS. 3a through 3c are enlarged fragmentary views of an alternative material suitable for window manufacture, illustrating the stages of its manufacture.
Figure 3B:
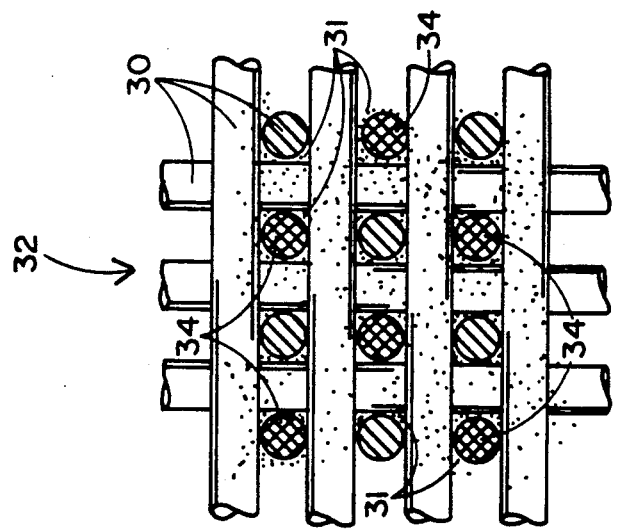
Figure 3A:
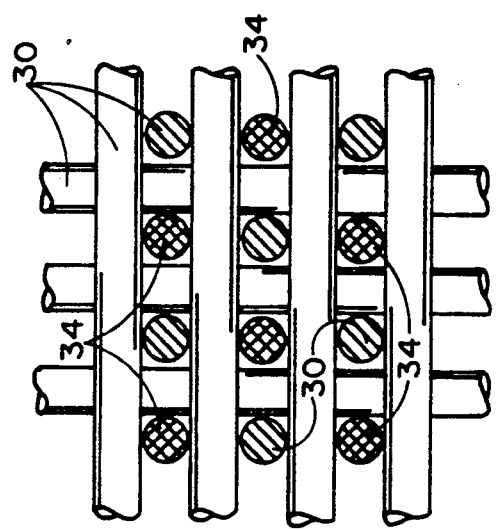

FIGS. 3a-c show another embodiment of the invention which is useful in the manufacture of generally planar coolable objects such as windows. In the embodiment of FIGS. 3a-c, a material known as AS-3 DX is made by a three-dimensional weaving process using silica fibers 30 (FIG. 3a). Interstices 31 between the fibers are filled by repeated dipping of the woven material into a silica solution, and by repetitive heat treatment (FIG. 3b). The completed AS-3 DX structure 32 is solid and non-porous.

In accordance with the invention, the fibers 34 woven in the "Z" direction (toward or away from the observer in FIGS. 3a-c) are graphite fibers rather than silica fibers, and any heat treatment to densify the structure 32 is done in an inert gas such as argon. When the structure 32 is completed, it is then heated to about 500–700° C. in air to vaporize the graphite fibers 34 (FIG. 3c). As a result, a multiplicity of fine parallel passages 35, all extending in the "Z" direction, make the structure permeable to cooling gas in that direction only. Similar passages may be achieved in other directions by using graphite fibers 34 in these directions.

We claim:

1. A method of fabricating coolable ceramic parts containing non-machinable coolant passages, comprising the steps of:
    a) individually forming separate portions of the part to be fabricated from a particulate ceramic material;
    b) partially densifying said portions to a first density level while embedding therein a graphite vaporizable material in the shape of said passages;
    c) assembling said portions to form the whole of said part;
    d) further partially densifying said assembled portions to a second density level sufficient to form a unitary preform of said part;
    e) fully densifying said assembled portions to integrate said part; and
    f) heating said integrated part beyond the vaporization temperature of said graphite vaporizable material.

2. The method of claim 1, in which said partial densifications are accomplished by cold pressing, and said full densification is accomplished by hot isostatic pressing.

3. The method of claim 1, in which said separate portions are formed from a non-metallic ceramic composition in powder form.

4. The method of claim 3, in which said ceramic composition is substantially 50% silicon nitride, 30% boron nitride, and 20% silica.

5. The method of claim 1, in which said full densification is performed in an inert atmosphere, and said heating step is performed in air.

6. The method of claim 5, in which said graphite material is in sheet form.

7. The method of claim 1, in which said first density level is substantially 25–30% of full density, and said second density level is substantially 50% of full density.

8. The method of claim 1, in which said graphite material is fully enclosed within said integrated part during said full densification step, and which comprises the further step of machining said integrated part to expose said graphite material prior to said heating step.

9. A method of fabricating coolable ceramic parts having a plurality of non-machinable generally parallel coolant passages therethrough, comprising the steps of:
    a) weaving a three-dimensional fabric in which the fibers in at least one of said dimensions are ceramic fibers, and at least a portion of the fibers in at least another of said dimensions are fibers of a vaporizable material;
    b) filling the interstices between said fibers with ceramic material to solidify said fabric; and
    c) heating said solidified fabric to at least the vaporization temperature of said vaporizable material.

10. The method of claim 2, in which said ceramic fibers are silica fibers.

11. The method of claim 1, in which said vaporizable fibers are graphite fibers.

12. The method of claim 1, in which said filler material is a non-metallic ceramic material, and said fabric is subjected to heat treatment in an inert atmosphere during the filling step.

13. The method of claim 1, in which said solidified fabric is heated in air at a temperature and for a time interval sufficient to fully vaporize said vaporizable material.

* * * * *